J. D. MURRAY.
PNEUMATIC CONVEYER.
APPLICATION FILED JULY 19, 1915.
1,202,088.
Patented Oct. 24, 1916.
3 SHEETS—SHEET 3.
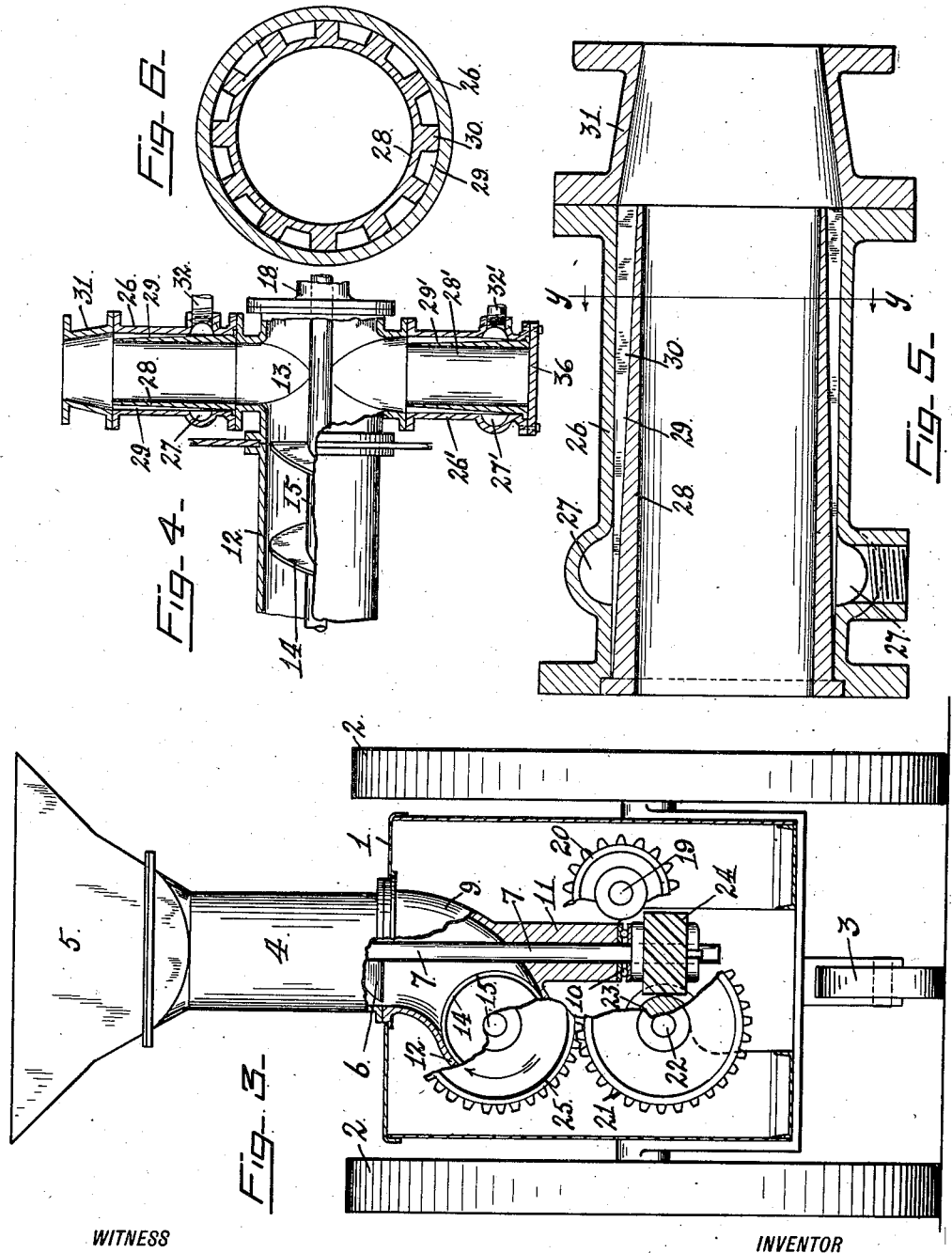

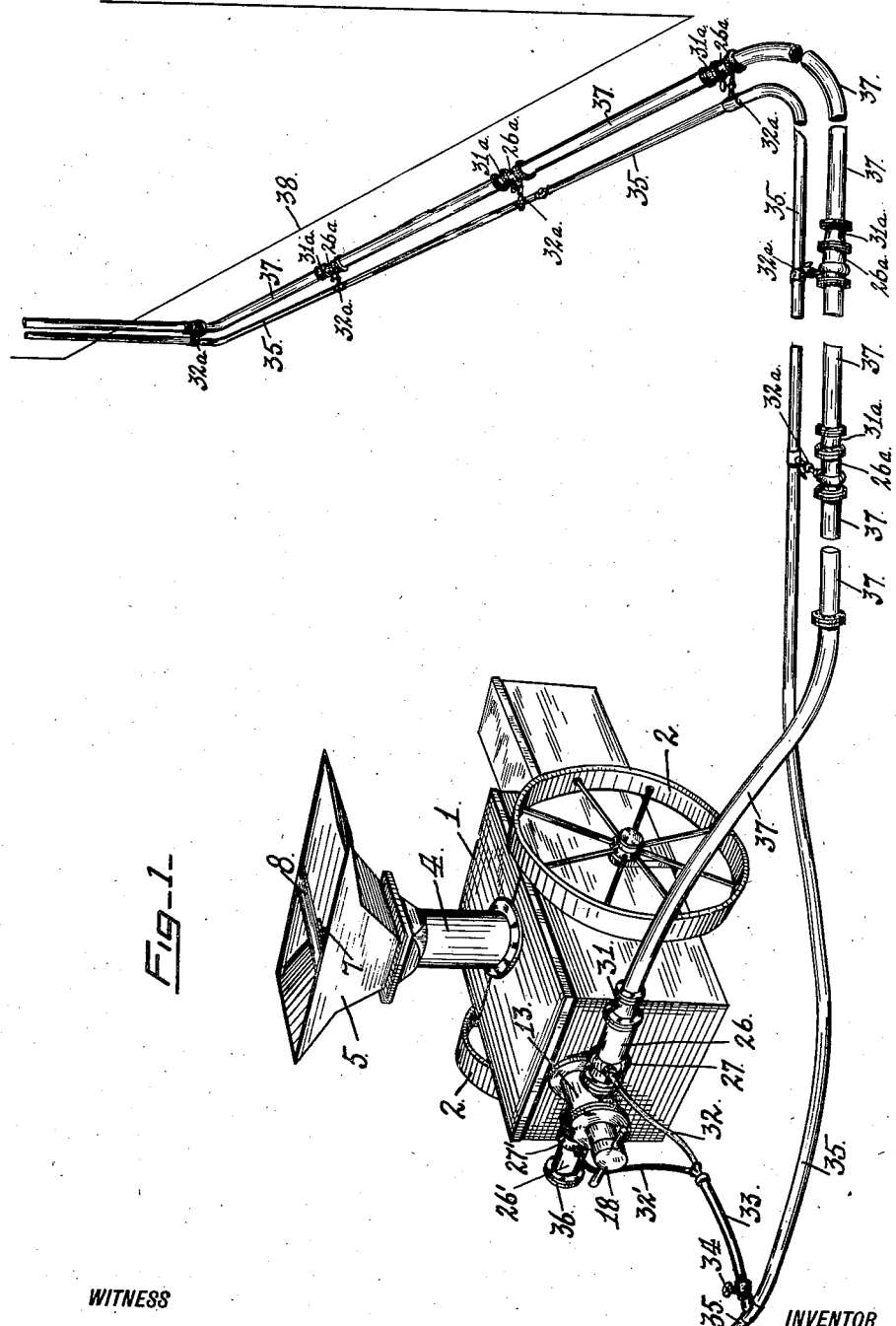

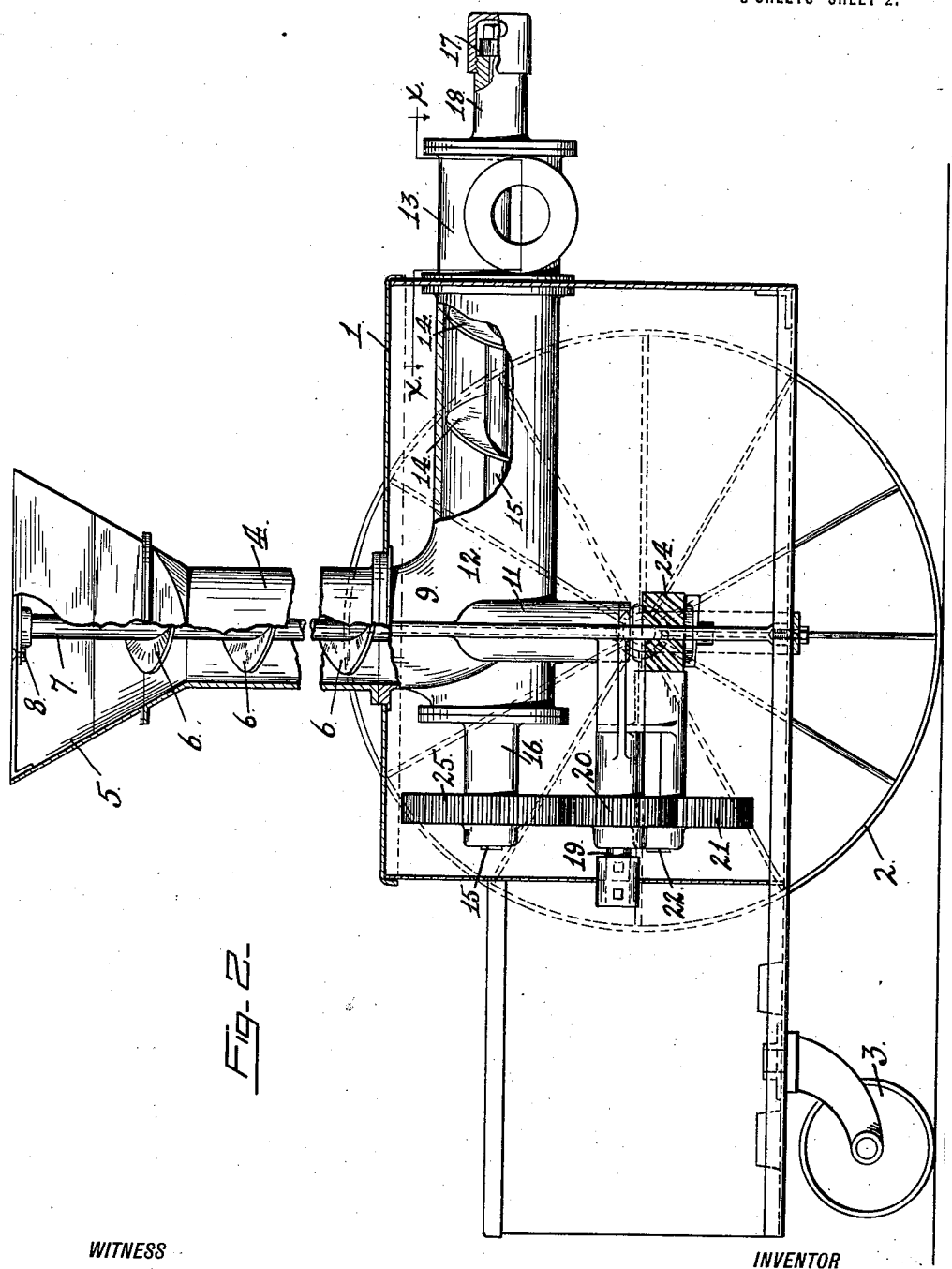

UNITED STATES PATENT OFFICE.

JOHN D. MURRAY, OF SAN FRANCISCO, CALIFORNIA, ASSIGNOR OF ONE-HALF TO THOMAS SCOBLE, OF SAN FRANCISCO, CALIFORNIA.

PNEUMATIC CONVEYER.

1,202,088.  Specification of Letters Patent.  Patented Oct. 24, 1916.

Application filed July 19, 1915. Serial No. 40,568.

*To all whom it may concern:*

Be it known that I, JOHN D. MURRAY, a citizen of the United States, residing in the city and county of San Francisco and State of California, have invented certain new and useful Improvements in Pneumatic Conveyers, of which the following is a specification.

My invention relates to the class of conveyers in which pneumatic pressure is employed to transport the material through conduits.

My invention is applicable for conveying loose materials of any nature, especially such as may be grouped under the term fluent solids, such as rice, wheat and other grains and seeds, and sand, it being particularly adapted for moist or wet sand.

My invention has for its object the provision of an apparatus or device capable of continuous feed and transportation of the material with relatively small pneumatic pressure and without liability of clogging, in contradistinction to a feed and conveyance in batches under high pressure.

With this object in view, my invention consists in the novel pneumatic conveyer, which I shall hereinafter fully describe, by reference to the accompanying drawings, in which—

Figure 1 is a perspective view of my pneumatic conveyer, broken, in part, in its service-lines. Fig. 2 is a side view, enlarged, partly in broken elevation and partly in section, of the supply and power end of my conveyer. Fig. 3 is a front end view, partly broken, of the same. Fig. 4 is a detail sectional view on the line $x$—$x$ of Fig. 2, showing one of the pneumatic pressure means. Fig. 5 is a longitudinal section, enlarged, of one of the air inlets of Fig. 4. Fig. 6 is a section on the line $y$—$y$ of Fig. 5.

For convenience of transportation and facility in movement, the supply and power end of the conveyer is a wheeled structure, in which the body is a closed box 1, provided with side wheels 2 and a steering or caster wheel 3. Supported from the top of the box, by its neck 4 is an open-top hopper 5.

Within the hopper is a vertically disposed screw-conveyer 6 which extends down in the hopper neck 4 to its lower end. The shaft 7 of this screw-conveyer is journaled at its upper end in a cross piece 8 in the hopper top and said shaft extends down through the neck 4 and through an elbow connection 9 which communicates with the hopper neck, and it has, as seen in Fig. 3, an anti-friction thrust step at 10 against a lug 11 of said elbow.

The elbow connection 9 leads into a horizontal shell or pipe 12, which at its rear end is closed, and at its forward end joins an extension T 13 exterior to the box. Within and closely fitting the shell or pipe 12 is a screw conveyer 14, the shaft 15 of which leads into the shell through a box 16 in its capped rear end, and extends through said shell and through the extension T, and its forward end is fitted with a thrust collar 17, as shown in Fig. 2, within the box cap 18 of said extension T.

The screw-conveyers are driven by the following transmission. 19 is the power inleading shaft. It carries a gear 20 which meshes with a gear 21 on a countershaft 22, the other end of which carries a worm 23 which meshes with a worm gear 24 on the foot of the shaft 7 of the vertically disposed screw-conveyer 6. The gear 21 meshes directly with a gear 25 on the rear end of the shaft 15 of the screw-conveyer 14.

With one of the branches of the extension T 13 is connected the delivery structure of the air-pressure inlet. This structure comprises, as shown in Figs. 4, 5 and 6, an outer shell 26 in which is formed an annular chamber 27, and an inner pipe or core member 28 in the outer surface of which are formed a circumferential series of air-grooves 29, separated by web-walls 30. These grooves 29 are closed at their rear ends, but at their forward ends they open peripherally into a distance coupling member 31, into which the inner pipe or core member 28 also opens. The outer shell 26 of the air-pressure structure has fitted to it an air branch 32 which, as shown in Fig. 1, joins a lateral 33 controlled by a cock 34, and leading from the main air-line 35, which may be supposed to lead from any suitable source of air under pressure. The air-branch 32 communicates directly with annular chamber 27 of the outer shell 26 of the air-pressure structure. With the other or opposite branch of the extension T 13 is connected a similar air-pressure structure, of which 26' is the outer shell with its annular chamber 27'; and 28' is its inner pipe or core member with its circumferential series of web-separated air-grooves 29'. This structure is however closed at its outer end by a cap 36, but it has an air branch 32' communicating with its annular chamber 27', and said branch, as shown in Fig. 1, connects with the air lateral 33 of the main air line 35.

It will now be seen that the air-pressure connections are such as to act, one by direct impact, and the other by suction injection, upon the material delivered to the extension T 13.

This description completes what I have termed the supply and power end of the apparatus. Now by referring to Fig. 1, it will be seen that with the distance coupling member 31, is connected the conveyer-pipe 37. This may be extended by properly coupled sections to any length and in any prescribed or predetermined course. I have here indicated it as being extended to the wall 38 of a building. It will also be seen that the main air line pipe 35 is extended along said conveyer pipe, and that at intervals, according to the length of the pipe, I establish one or more air-pressure structures, which from their function, may properly be termed "boosters" or accelerators. I have here shown six of these, each indicated by its outer shell 26ª, its cock-controlled air-branch 32ª, and its distance coupling member 31ª.

The operation of the apparatus is as follows:—The material is continuously fed or supplied to the open topped hopper 5 so that it is kept full. From the hopper it passes down through the neck 4, being positively advanced by the screw conveyer 6, and filling the helical valley of said conveyer and the confining hopper neck from top to bottom. Thus positively carried down, the material passing through the elbow 9 enters the shell or pipe 12 below, and the helical valley of the horizontal screw-conveyer 14 therein, and fills them from end to end. From the end of the horizontal screw-conveyer 14 the material is positively, continuously and uniformly delivered into the extension T 13, wherein it is immediately subjected to the pneumatic pressure effected by the air-pressure structures connected with said T. Under this pressure the material is advanced through the conveyer pipe 37 to its discharge, if the distance be relatively small. But if the destination of the material be more remote and the conveyer pipe 37 therefore too long for practical operation under the air pressure at a single point, one or more of the succeeding or "booster" air-pressure structures may be brought into play, and the pressure thus relayed, as it were.

In the operation thus described, it will be seen that by reason of the relatively tight fitting screw-conveyers, the material filling them offers full resistance to any back air-pressure. Therefore, an open hopper can be employed, and as a result of this, the feed may be continuous and uninterrupted. It will also be seen that by reason of the screw-conveyers, the material is positively and uniformly advanced to the sphere of action of pneumatic pressure and that this is true, even though the material, such as sand be moist, and, therefore, even in the latter case, there will be no clogging or stopping up, and, therefore, finally the pneumatic pressure may be less than in a case, as is common practice, of a batch of sand forced down from a hopper, closed to prevent back air pressure, and packed into the pipe to be subjected to a powerful air blast to dislodge, start, advance and eject it.

The circumferential series of air-grooves in the air-pressure structures provides for the delivery of air at the proper points under the most economical conditions of volume.

I claim:—

1. A pneumatic-conveyer, comprising a hopper to which the material to be conveyed is supplied, said hopper having a neck; a screw-conveyer within and closely incased by the hopper neck to advance the material therethrough; a shell having an air-tight connection with the hopper-neck; a second screw-conveyer within and closely incased by said shell and adapted to receive the material from the first screw-conveyer and to advance it; a T extension member secured to the shell and to which the second screw-conveyer delivers the material; means connected with opposite branches of said member for effecting pneumatic pressure therein to advance the material therethrough; and a conveyer-pipe connected with one of the branches of said T extension member.

2. In a pneumatic-conveyer, the combination of a hopper having a neck; a shell having an air-tight connection with said hopper; a screw-conveyer within and closely incased by said neck to advance the material therethrough; a second screw-conveyer within and closely incased by the shell and adapted to receive the material from the first conveyer and to advance it; a T extension member secured to the delivery end of the shell and to which the second screw-conveyer delivers the material; an air inlet structure fitted to opposite branches of said extension, each of said structures consisting of an outer member with an annular chamber to initially receive the air and an inner hollow core member having a circumferential series of separated longitudinally directed air grooves; and a conveyer pipe connected with one of said air inlet structures.

In testimony whereof I have signed my name to this specification in the presence of two subscribing witnesses.

JOHN D. MURRAY.

Witnesses:
WM. F. BOOTH,
D. B. RICHARDS.